No. 692,394. Patented Feb. 4, 1902.
D. B. WHITEHILL.
STOP COCK.
(Application filed Apr. 11, 1901.)
(No Model.)
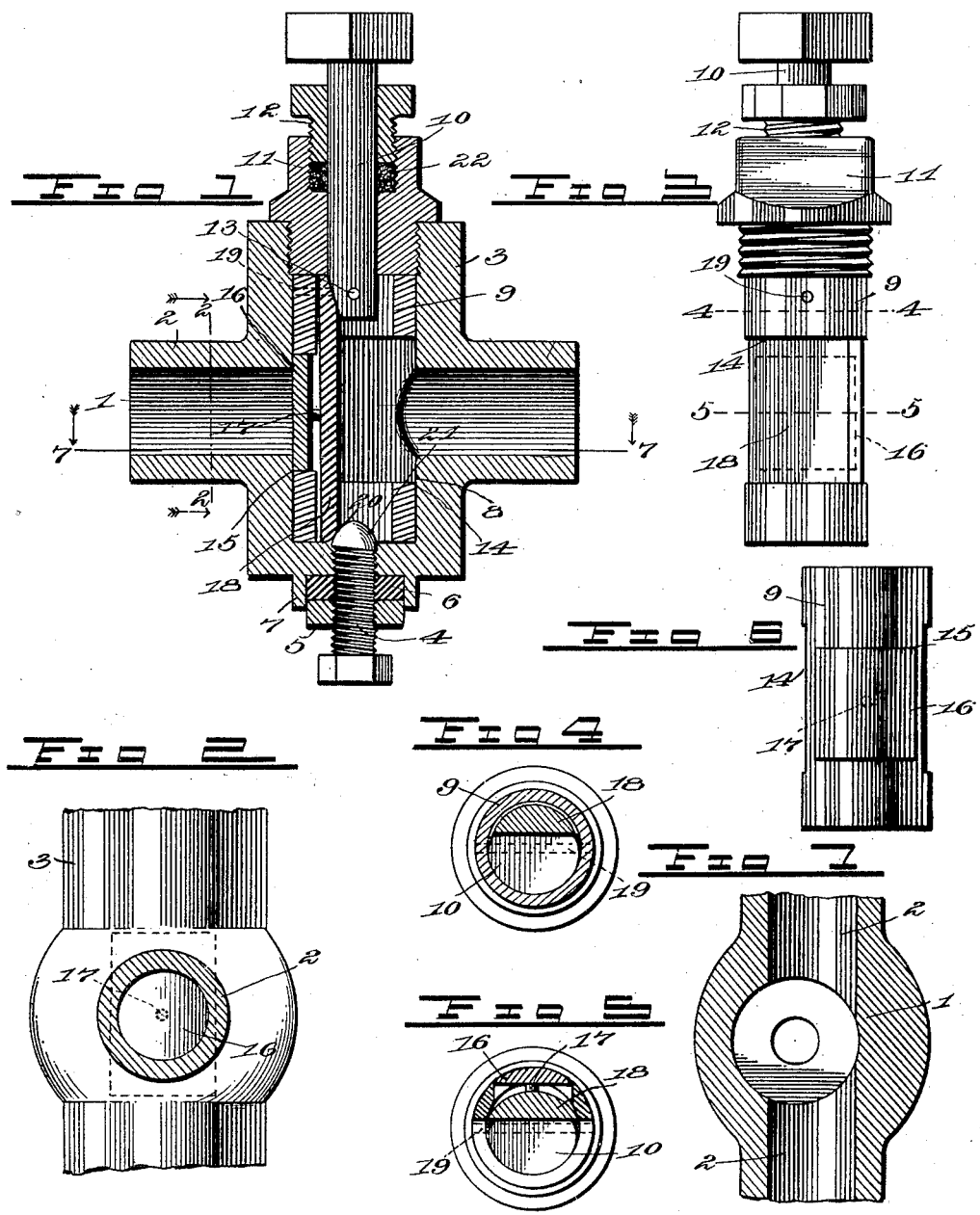
David B. Whitehill, Inventor:
By E. G. Siggers, Attorney.
Witnesses:
John Maupin
R. M. Elliott.

UNITED STATES PATENT OFFICE.

DAVID BROWN WHITEHILL, OF NORTH CLARENDON, PENNSYLVANIA.

STOP-COCK.

SPECIFICATION forming part of Letters Patent No. 692,394, dated February 4, 1902.

Application filed April 11, 1901. Serial No. 55,381. (No model.)

*To all whom it may concern:*

Be it known that I, DAVID BROWN WHITEHILL, a citizen of the United States, residing at North Clarendon, in the county of Warren and State of Pennsylvania, have invented a new and useful Stop-Cock, of which the following is a specification.

This invention relates to straightway stopcocks, such as are used for controlling the flow of water, steam, gas, air, or any other liquid or fluid through a passage-way or pipe.

The present invention is designed as a radical departure from and a marked improvement on that class of stop-cocks wherein the plug is tapered and works in a similarly-shaped seat or bore in the shell or casing of the cock, the plug in this character of cocks having a transverse opening through it to establish communication with a passage-way in the body or with pipe-lines connected with the shell. In stop-cocks employing this character of plug both sides of the plug act as a cut-off when the core is turned at right angles to the passage-ways, the taper of the plug and its coaction with the walls of the seat or bore being solely depended on to provide a leak-proof cock. Where the plug fits a seat exactly—and this is generally accomplished by the expensive procedure of grinding the plug to the seat—no leak will occur, and while the parts are in perfect shape tightening of the plug in its seat to take up wear will obviate leakage. The great and well-known objections to tapered plugs is that the plug throughout its entire length must exactly fit its seat or bore; but owing to poor material employed and careless workmanship a perfectly tight stop-cock is rarely seen. Aside from this the plug by frequent turning becomes loosened, even when not worn, thereby allowing grit or other foreign matter to lodge between it and its seat, and this grit, when the plug is tightened to take up the wear, cuts and frequently ruins the plug. As a rule the plug is forced in tightly to prevent leakage, and this, taken with the deteriorating action of heat and cold and the strain of the pipe-line due to alternate expansion and contraction, gradually destroys the original shape of the shell, causing the cock to leak. Aside from the disadvantages above noted a cock employing a tapered plug is liable to leak internally through the passage-way, thereby occasioning a waste of water or the like. Further, where the plug is forced tightly into the bore it frequently happens that force, as a hard blow, is necessary to loosen it, and, as well known, this very often results in the breaking of the plug, thereby destroying the cock, as it will cost more to replace the plug with a new one—owing to the fact that there is no standard taper to the plugs, and therefore no duplicates—than to supply an entirely new cock. A further disadvantage common to a taper plug is that it has an adjusting-nut on its small end, and this nut moves with the plug each time it is turned and either tightens under the turning by frictional contact with the shell, and thus renders the plug difficult to operate, or loosens and permits of the leakage of the liquid or fluid.

It is the object of my invention to obviate the objections above noted in a simple and effective manner by presenting a cock having a plug or core provided with a valve so arranged that it may be made to fit its seat perfectly, independently of the core, thereby to take up wear, and thus prevent leakage.

A further object is to simplify the construction of the cock by obviating the necessity of grinding the plug to its seat, thus in a readily-appreciable manner greatly reducing the cost of production of the cock.

A salient feature of my invention, and that which differentiates it from stop-cocks of this character in the art, is that the plug or core need not of necessity closely fit the bore in the shell, as by the arrangement of valve employed this will be rendered unnecessary.

A further salient feature of my invention is that the core or plug is of the same diameter from end to end, this construction being rendered possible by the character of valve employed in connection with it.

Further and more specific details of construction and additional points of novelty will be hereinafter described, and pointed out in the claims.

In the accompanying drawings, forming a part of this specification, and in which like numerals of reference indicate corresponding parts, I have illustrated a form of embodiment of my invention, it being understood that the same may be carried into effect in other ways without departing from the spirit of the same, and in the drawings—

Figure 1 is a view in longitudinal section. Fig. 2 is a view in transverse elevation taken on the line 2 2 of Fig. 1 and looking in the direction of the arrow. Fig. 3 is a detached detail view of the plug removed from the shell. Fig. 4 is a view in transverse section taken on the line 4 4 of Fig. 3. Fig. 5 is a similar view taken on the line 5 5 of Fig. 3. Fig. 6 is a view in elevation taken from the side of the plug opposite that shown in Fig. 3, exhibiting more clearly the manner of arrangement of the valve with relation to the plug. Fig. 7 is a horizontal sectional detail view taken on the line 7 7, Fig. 1, and looking in the direction of the arrow.

Referring to the drawings, 1 designates the shell or casing of the cock, the same in this instance being exhibited as a four-membered structure, of which two members 2 constitute the pipe-line connections or passage-way and the members 3 the bore of plug-seat, the bore being by preference the same diameter throughout the entire length. As shown in Fig. 1, that portion of one of the members 3 which will constitute the bottom of the shell or casing is made solid or closed, and is provided with an opening through which passes a valve-adjusting bolt 4, presently to be described, the bolt having a threaded engagement with the opening in the member 3 and carrying a nut 5 to bear upon a packing-ring 6 to effect a fluid-tight juncture between the bolt and the shell at this point. The packing-ring 6 is housed in a cup or recess 7, formed on the face of the bottom of the shell, thereby to limit outward yielding of the packing-ring, so that when the nut 5 is forced against the ring this will be compressed and caused to fit tightly around the threads of the bolt 4.

Within the bore or plug-seat 8 is the plug or core comprising the core or plug proper, 9, a stem 10, a stuffing-box 11, and a gland 12. The core or plug is in the present instance a separate structure and is connected to the stem by a rivet 13, this arrangement being adapted from a standpoint of economy, as should the plug become unfit for use the remaining parts would still be useful, and to present the cock in its normal operative condition it would be only necessary to remove the rivet 13 and supply a new plug for that destroyed. The plug is cylindrical in shape and preferably the same diameter throughout its entire length. One side is cut away, as at 14, to a width somewhat greater than that of the diameter of the passage-way, thus to permit an uninterrupted passage through the cock when the valve is turned to a position to open the passage-way. To cause that portion of the core lying in line with the passage-way to present as slight obstruction to the passage of fluid through the cock as possible, the bore is to one side of the center of the shell, and this arrangement, for the reason stated, will generally be preferred; but it is to be understood that, if preferred, the bore may be central with the shell or casing. The side of the plug or core is cut away, as shown at 15, for a length and width to span the opening in the passage-way, and in the seat thus formed is placed a valve 16, the same in this instance being a piece of metal flat on its inner face and rounded on its outer face to conform to the circumference of the plug. This valve may be made of the same material as the plug; but ordinarily I prefer to make it of softer metal, so that if grit or other foreign substances should get between it and the seat the damage will be sustained by the valve and not by the seat. The valve is not attached to the core—that is to say, it merely rests in the seat 15—so that to replace with a new valve one that is destroyed it will only be necessary to remove the core from the shell, lift out the valve, and insert a new one.

To cause outward adjustment of the valve, thereby to bring it into engagement with the seat, and thus through the medium of the bolt 4 to cause it to bind with sufficient tightness against the seat to effect a fluid-tight joint, a tongue 18 is provided, the same being pivotally connected with the plug or core, as by a rivet 19. (Clearly shown in Fig. 4.) The top of the tongue is by preference flat and lies in a plane coincident with that of the edges of the walls formed by the recess at 14, the under side of the tongue being by preference rounded, although it may be flat. The lower or outer end of the tongue is beveled or cut away, as shown at 20 in Fig. 1, this beveled portion to be engaged by the conical or pointed end 21 of the bolt 4. It will be readily appreciated by reference to Fig. 1 that by the coaction between the tongue 18 and the bolt 4 any desired pressure may be applied to the valve to cause it under all conditions of use tightly to bear against its seat. The tongue 18 being pivoted, its free end will necessarily move in the arc of a circle, so that, except when the valve is removed, it will never occupy a plane parallel with that of the valve. As it is absolutely essential that the valve should accurately bear against the seat throughout its length, and as the angular disposition of the tongue to the valve would preclude this were the contact between the tongue and the valve a direct one, the valve is provided with a fulcrum-pin 17, constituting a bearing, which bears against the tongue, as clearly shown in Fig. 1. By this arrangement it will be immaterial at what angle the tongue may be disposed with relation to the valve to effect exact seating of the valve, as through the small contact-point presented by the fulcrum-pin the valve will always be held true against its seat. Instead of placing the fulcrum-pin on the valve it may be carried by the tongue and will perform the same function, and as this arrangement will be obvious illustration is deemed unnecessary. The fulcrum-pin may be either integral with or be secured to the tongue and may have its contact-point flat or rounded, as preferred.

The stuffing-box 11, to which reference has been made, comprises a nut having external and internal threads, the external threads to engage a threaded opening in the top member 3 of the shell and the internal threads to be engaged by the gland 12. The stuffing-box contains a suitable packing-ring 22, to be borne upon by the gland, thus to effect a fluid-tight juncture between the packing-ring and the stem. As here shown, the stem is provided with a squared head, to be engaged by a suitable tool to turn the valve; but it is to be understood, if preferred, a hand-wheel may be placed on the stem in lieu of the head.

From the foregoing description it will be observed that the only part of this stop-cock subjected to any appreciable wear is the smallest part thereof—namely, the valve. As before pointed out, the plug may fit loosely, and generally will fit loosely, within the bore, as it is unnecessary that there should be any close contact between the bore and the plug at any point except that opposite the passage-way, and this part, as described, is borne upon by the valve. Wear from use will therefore be confined almost wholly and entirely to the valve, and as this may be cheaply made its destruction will be a matter of small moment and its replacement with a new one a thing easily accomplished and involving but a small amount of labor.

Having thus fully described my invention, what I claim as new, and desire to secure by Letters Patent, is—

1. In a stop-cock, a plug or core, a valve carried thereby, a pivoted tongue bearing on the valve, and means for positively adjusting the tongue with relation to the valve.

2. In a stop-cock, a plug, a valve carried thereby, a pivoted tongue carried by the plug and means for forcing the tongue against the valve.

3. In a stop-cock, a plug, a valve carried thereby, a tongue, and a set-screw carried by the shell or casing and engaging the tongue to hold the same in engagement with the valve.

4. In a stop-cock, a shell, a rotary plug fitting therein, a pivoted tongue carried by the plug, and means for adjusting the plug with relation to the valve.

5. A stop-cock having a casing provided with a passage-way and with a bore or seat, a plug working in the seat, a valve carried by the plug and bearing against the seat and controlling the passage-way, a tongue, and means for forcing the tongue against the valve.

6. A stop-cock having a casing provided with a passage-way and with a bore or seat, a plug working in the seat, a valve carried by the plug and bearing against the seat and controlling the passage-way, a tongue, and a set-screw carried by the casing to force the tongue against the valve.

7. A stop-cock having a casing provided with a passage-way and with a bore or seat, a plug working in the seat, a valve carried by the plug and bearing against the seat and controlling the passage-way, a tongue, a set-screw carried by the casing to force the tongue against the valve, a packing-ring surrounding the screw, and a nut carried by the screw to compress the packing-ring.

8. In a stop-cock, the combination with a casing provided with a bore or seat and with passage-ways, of a plug or core for controlling the passage-ways, the plug or core comprising a hollow cylinder having one side cut away to a length somewhat greater than that of the width of the passage-way, a detachable valve fitting in an opening opposite the cut-away portion, a tongue arranged within the plug, and means carried by the casing for forcing the tongue against the valve, a stem pivotally connected with the plug or core, a stuffing-box on the stem to engage a threaded opening in the casing, and a gland also on the stem to engage a packing-ring in the stuffing-box to effect a fluid-tight juncture.

9. In a stop-cock, a hollow cylindrical plug having one side cut away, an orifice in the plug opposite the cut-away portion, a valve fitted in the orifice and having its outer face conforming to the circumference of the plug, a tongue bearing on the valve and means for adjusting the tongue with relation to the valve.

10. In a stop-cock, a plug, a valve carried thereby provided with a fulcrum-pin, and an adjustable tongue bearing on the pin.

11. In a stop-cock, a plug, a valve carried thereby and provided with a fulcrum-pin, a tongue, and means for forcing the tongue against the pin.

12. In a stop-cock, a casing provided with a bore or seat, a plug working in the bore, a valve carried by the plug and provided with a fulcrum-pin, a tongue, and a screw carried by the casing to force the tongue against the pin.

13. In a stop-cock, a shell or casing provided with a passage-way and with a bore or seat of the same diameter throughout its length, in combination with a hollow cylindrical plug or core loosely fitting in the seat, a valve carried by the plug, and means carried by the casing for forcing the valve against the seat.

In testimony that I claim the foregoing as my own I have hereto affixed my signature in the presence of two witnesses.

DAVID BROWN WHITEHILL.

Witnesses:
JOHN H. SIGGERS,
FLORENCE E. WALTER.